(12) United States Patent
Moganty et al.

(10) Patent No.: US 10,868,332 B2
(45) Date of Patent: Dec. 15, 2020

(54) MODIFIED IONIC LIQUIDS CONTAINING PHOSPHORUS

(71) Applicant: NOHMS Technologies, Inc., Rochester, NY (US)

(72) Inventors: Surya Moganty, Rochester, NY (US);
John Sinicropi, Rochester, NY (US);
Gabriel Torres, Rochester, NY (US);
Luigi Abbate, Rochester, NY (US);
Yue Wu, Rochester, NY (US)

(73) Assignee: NOHMS TECHNOLOGIES, INC., Rochester, NY (US)

(*) Notice: Subject to any disclaimer, the term of this patent is extended or adjusted under 35 U.S.C. 154(b) by 415 days.

(21) Appl. No.: 15/476,342

(22) Filed: Mar. 31, 2017

(65) Prior Publication Data
US 2017/0288269 A1 Oct. 5, 2017

Related U.S. Application Data

(60) Provisional application No. 62/317,025, filed on Apr. 1, 2016.

(51) Int. Cl.
| | | |
|---|---|---|
| *H01M 10/0525* | (2010.01) | |
| *H01M 10/0567* | (2010.01) | |
| *C07F 9/572* | (2006.01) | |
| *H01G 11/58* | (2013.01) | |
| *H01G 11/60* | (2013.01) | |
| *H01G 11/62* | (2013.01) | |
| *H01G 11/64* | (2013.01) | |
| *H01M 4/525* | (2010.01) | |
| *H01M 4/587* | (2010.01) | |
| *H01M 10/0568* | (2010.01) | |
| *H01M 10/0569* | (2010.01) | |

(52) U.S. Cl.
CPC ......... *H01M 10/0567* (2013.01); *C07F 9/572* (2013.01); *H01G 11/58* (2013.01); *H01G 11/60* (2013.01); *H01G 11/62* (2013.01); *H01G 11/64* (2013.01); *H01M 4/525* (2013.01); *H01M 4/587* (2013.01); *H01M 10/0525* (2013.01); *H01M 10/0568* (2013.01); *H01M 10/0569* (2013.01); *H01M 2300/0037* (2013.01); *H01M 2300/0045* (2013.01)

(58) Field of Classification Search
CPC ......... H01M 10/0567; H01M 10/0525; H01M 10/0568; H01M 10/0569; H01M 4/525; H01M 4/587; H01M 2300/0045; H01M 2300/0037; H01G 11/60; H01G 11/62; H01G 11/64

See application file for complete search history.

(56) References Cited

U.S. PATENT DOCUMENTS

| | | |
|---|---|---|
| 2,922,738 A | 1/1960 | McDermott et al. |
| 3,308,208 A | 3/1967 | Seil et al. |
| 3,318,810 A | 5/1967 | McGrath et al. |
| 3,384,685 A | 5/1968 | Boschan et al. |
| 3,384,686 A | 5/1968 | Boschan et al. |
| 3,661,843 A | 5/1972 | Hechenbleikner et al. |
| 4,000,101 A | 12/1976 | McNally |
| 5,550,276 A | 8/1996 | Wirth et al. |
| 5,580,684 A | 12/1996 | Yokoyama et al. |
| 5,830,600 A | 11/1998 | Narang et al. |
| 6,040,091 A | 3/2000 | Sugita et al. |
| 6,200,701 B1 | 3/2001 | Gan et al. |
| 6,339,053 B1 | 1/2002 | Chivers et al. |
| 6,746,794 B2 | 6/2004 | Mandal et al. |
| 6,841,301 B2 | 1/2005 | Heider et al. |
| 6,853,472 B2 | 2/2005 | Warner et al. |
| 6,902,684 B1 | 6/2005 | Smith et al. |
| 6,919,141 B2 | 7/2005 | Gan et al. |
| 6,939,647 B1 | 9/2005 | Jow et al. |
| 7,169,511 B2 | 1/2007 | Noda et al. |
| 7,202,012 B2 | 4/2007 | Norcini et al. |
| 7,217,480 B2 | 5/2007 | Han et al. |
| 7,316,866 B2 | 1/2008 | Yong et al. |
| 7,341,807 B2 | 3/2008 | Wang et al. |
| 7,479,353 B2 | 1/2009 | Hollenkamp et al. |
| 7,503,942 B2 | 3/2009 | Kurihara et al. |
| 7,582,389 B2 | 9/2009 | Matsui et al. |
| 7,626,804 B2 | 12/2009 | Yoshio et al. |
| 7,651,815 B2 | 1/2010 | Sano et al. |
| 7,713,658 B2 | 5/2010 | Mizuta et al. |
| 7,722,898 B2 | 5/2010 | Bhatt et al. |
| 7,754,388 B2 | 7/2010 | Nakagawa et al. |
| 7,833,661 B2 | 11/2010 | Xiao et al. |
| 7,834,197 B2 | 11/2010 | Nishida et al. |
| 7,854,854 B2 | 12/2010 | Nishida et al. |

(Continued)

FOREIGN PATENT DOCUMENTS

| | | |
|---|---|---|
| CA | 2776178 | 10/2013 |
| CN | 1635063 A | 7/2005 |

(Continued)

OTHER PUBLICATIONS

CN 103374035 (Cas Abstract).*

(Continued)

*Primary Examiner* — Alexander Usyatinsky
(74) *Attorney, Agent, or Firm* — Bond, Schoeneck & King, PLLC; Joseph Noto

(57) ABSTRACT

The present disclosure is directed to a phosphorus-modified ionic liquid compound, the synthesis thereof and an electrochemical cell electrolyte containing the phosphorus-modified ionic liquid compound.

8 Claims, 3 Drawing Sheets

(56) References Cited

U.S. PATENT DOCUMENTS

| | | | |
|---|---|---|---|
| 7,875,732 | B2 | 1/2011 | Nishida et al. |
| 7,939,200 | B2 | 5/2011 | Ohzuku et al. |
| 7,960,061 | B2 | 6/2011 | Jost et al. |
| 7,998,615 | B2 | 8/2011 | Matsui et al. |
| 8,034,227 | B2 | 10/2011 | Rosvall et al. |
| 8,057,937 | B2 | 11/2011 | Sung et al. |
| 8,168,331 | B2 | 5/2012 | Best et al. |
| 8,168,334 | B2 | 5/2012 | Nakanishi et al. |
| 8,192,863 | B2 | 6/2012 | Best et al. |
| 8,211,277 | B2 | 7/2012 | Ignatyev et al. |
| 8,227,388 | B2 | 7/2012 | Tagawa et al. |
| 8,349,503 | B2 | 1/2013 | Saruwatari et al. |
| 8,404,876 | B2 | 3/2013 | Sharma et al. |
| 8,597,854 | B2 | 12/2013 | Onuma et al. |
| 8,647,780 | B2 | 2/2014 | Michot et al. |
| 8,673,499 | B2 | 3/2014 | Nakura |
| 8,785,057 | B1 | 7/2014 | Smith et al. |
| 8,795,903 | B2 | 8/2014 | Smart et al. |
| 8,802,265 | B2 | 8/2014 | Noack et al. |
| 8,841,035 | B2 | 9/2014 | Choi et al. |
| 8,853,448 | B2 | 10/2014 | Sanchez et al. |
| 8,907,209 | B2 | 12/2014 | Saito |
| 8,915,975 | B2 | 12/2014 | Le Bideau et al. |
| 9,006,457 | B2 | 4/2015 | Schmidt et al. |
| 9,012,093 | B2 | 4/2015 | Matsumoto et al. |
| 9,034,517 | B1 | 5/2015 | Smith et al. |
| 9,059,481 | B2 | 6/2015 | He et al. |
| 9,076,996 | B2 | 7/2015 | Bradwell et al. |
| 9,079,156 | B2 | 7/2015 | Aduri et al. |
| 9,123,972 | B2 | 9/2015 | Giroud et al. |
| 9,130,240 | B2 | 9/2015 | Rosciano et al. |
| 9,145,341 | B2 | 9/2015 | Ein-Eli et al. |
| 9,159,995 | B2 | 10/2015 | Ein-Eli et al. |
| 9,172,111 | B2 | 10/2015 | Doe et al. |
| 9,177,721 | B2 | 11/2015 | Amatucci et al. |
| 9,190,696 | B2 | 11/2015 | He et al. |
| 9,196,926 | B2 | 11/2015 | Kaneko et al. |
| 9,203,109 | B2 | 12/2015 | Hu et al. |
| 9,206,210 | B2 | 12/2015 | Gering et al. |
| 9,214,697 | B2 | 12/2015 | Kashima et al. |
| 9,231,273 | B2 | 1/2016 | Lee et al. |
| 9,293,786 | B1 | 3/2016 | Krishnan et al. |
| 9,300,009 | B2 | 3/2016 | Sun et al. |
| 9,343,787 | B2 | 5/2016 | Takechi et al. |
| 9,362,564 | B2 | 6/2016 | Itakura et al. |
| 9,368,831 | B2 | 6/2016 | He et al. |
| 9,391,341 | B2 | 7/2016 | Sakai et al. |
| 9,397,366 | B2 | 7/2016 | Archer et al. |
| 9,431,672 | B2 | 8/2016 | Datta et al. |
| 9,458,180 | B2 | 10/2016 | Sievert et al. |
| 9,472,831 | B2 | 10/2016 | Roschenthaler et al. |
| 9,493,882 | B2 | 11/2016 | Bhavaraju et al. |
| 9,514,894 | B2 | 12/2016 | Okuno et al. |
| 9,540,312 | B2 | 1/2017 | Teran et al. |
| 9,543,616 | B2 | 1/2017 | Oh et al. |
| 9,543,617 | B2 | 1/2017 | Siret et al. |
| 9,558,894 | B2 | 1/2017 | Signorelli et al. |
| 9,564,656 | B1 | 2/2017 | Zhamu et al. |
| 9,601,803 | B2 | 3/2017 | He et al. |
| 9,601,805 | B2 | 3/2017 | He et al. |
| 9,620,820 | B2 | 4/2017 | Itakura et al. |
| 9,624,160 | B2 | 4/2017 | Schmidt et al. |
| 9,627,713 | B2 | 4/2017 | Moganty et al. |
| 9,627,727 | B2 | 4/2017 | Takechi et al. |
| 9,666,916 | B2 | 5/2017 | Mizuno et al. |
| 9,698,415 | B2 | 7/2017 | Takami et al. |
| 9,735,445 | B2 | 8/2017 | Zhamu et al. |
| 9,768,469 | B2 | 9/2017 | Kim et al. |
| 9,799,881 | B2 | 10/2017 | Sankarasubramanian et al. |
| 9,812,736 | B2 | 11/2017 | He et al. |
| 9,843,074 | B2 | 12/2017 | Röschenthaler et al. |
| 9,843,081 | B2 | 12/2017 | Kwon et al. |
| 9,847,180 | B2 | 12/2017 | Kaneko et al. |
| 9,856,341 | B2 | 1/2018 | Lee et al. |
| 9,884,972 | B2 | 2/2018 | Chivers |
| 9,905,856 | B1 | 2/2018 | Zhamu et al. |
| 9,917,339 | B2 | 3/2018 | Takechi |
| 9,941,559 | B2 | 4/2018 | Mizuno et al. |
| 9,966,644 | B2 | 5/2018 | Roev et al. |
| 9,979,037 | B2 | 5/2018 | Ogata et al. |
| 9,997,806 | B2 | 6/2018 | Ito et al. |
| 10,017,866 | B2 | 7/2018 | Yoo et al. |
| 10,026,993 | B2 | 7/2018 | Srour et al. |
| 10,026,995 | B2 | 7/2018 | Zhamu et al. |
| 10,044,031 | B2 | 8/2018 | Zhang et al. |
| 10,056,616 | B2 | 8/2018 | Teraoka et al. |
| 10,056,645 | B2 | 8/2018 | Lee et al. |
| 10,074,874 | B2 | 9/2018 | Dubois et al. |
| 10,077,231 | B2 | 9/2018 | Teran et al. |
| 10,122,001 | B2 | 11/2018 | Elabd et al. |
| 10,122,047 | B2 | 11/2018 | Oyama |
| 10,128,541 | B2 | 11/2018 | Itakura et al. |
| 10,128,551 | B2 | 11/2018 | Roev et al. |
| 10,145,019 | B2 | 12/2018 | Bhavaraju et al. |
| 10,158,121 | B2 | 12/2018 | Zhamu et al. |
| 10,177,381 | B2 | 1/2019 | Fanous et al. |
| 10,227,288 | B2 | 3/2019 | Teran et al. |
| 10,236,536 | B2 | 3/2019 | Kim et al. |
| 10,290,898 | B2 | 5/2019 | Choi et al. |
| 10,297,394 | B2 | 5/2019 | Krishnan et al. |
| 10,308,587 | B2 | 6/2019 | Teran et al. |
| 10,312,551 | B2 | 6/2019 | Zheng et al. |
| 10,340,515 | B2 | 7/2019 | De Vries et al. |
| 10,340,524 | B2 | 7/2019 | Lee et al. |
| 10,347,904 | B2 | 7/2019 | Cho et al. |
| 10,347,938 | B2 | 7/2019 | Lee et al. |
| 10,361,456 | B2 | 7/2019 | Moon et al. |
| 10,411,302 | B2 | 9/2019 | Park et al. |
| 2004/0086782 | A1 | 5/2004 | Zhang et al. |
| 2004/0091772 | A1 | 5/2004 | Ravdel et al. |
| 2004/0096747 | A1 | 5/2004 | Schwake |
| 2004/0218347 | A1 | 11/2004 | Schwake |
| 2005/0019670 | A1 | 1/2005 | Armine et al. |
| 2005/0031941 | A1 | 2/2005 | Zhang et al. |
| 2006/0024577 | A1 | 2/2006 | Schwake |
| 2006/0035137 | A1 | 2/2006 | Maruo et al. |
| 2006/0128572 | A1 | 6/2006 | Lange et al. |
| 2006/0134525 | A1 | 6/2006 | Kleijnen et al. |
| 2007/0166591 | A1 | 7/2007 | Machida et al. |
| 2007/0238000 | A1 | 10/2007 | Koyama et al. |
| 2008/0032173 | A1 | 2/2008 | Koyama et al. |
| 2008/0137265 | A1 | 6/2008 | Venkateswaran |
| 2008/0138700 | A1 | 6/2008 | Horpel et al. |
| 2008/0193853 | A1 | 8/2008 | Kim et al. |
| 2009/0169992 | A1 | 7/2009 | Ishiko et al. |
| 2009/0173381 | A1 | 7/2009 | Kang et al. |
| 2009/0286163 | A1 | 11/2009 | Shin et al. |
| 2010/0028785 | A1 | 2/2010 | Choi et al. |
| 2010/0159338 | A1 | 6/2010 | Nakagawa et al. |
| 2010/0178555 | A1 | 7/2010 | Best |
| 2010/0209813 | A1 | 8/2010 | Onuma et al. |
| 2010/0273063 | A1 | 10/2010 | Wallace et al. |
| 2010/0304225 | A1 | 12/2010 | Pascaly et al. |
| 2010/0311998 | A1 | 12/2010 | De Wolf et al. |
| 2011/0070504 | A1 | 3/2011 | Matsumoto et al. |
| 2011/0080689 | A1 | 4/2011 | Bielawski et al. |
| 2011/0136018 | A1 | 6/2011 | Nogi et al. |
| 2011/0143212 | A1 | 6/2011 | Angell et al. |
| 2011/0159379 | A1 | 6/2011 | Matsumoto et al. |
| 2011/0206979 | A1 | 8/2011 | Giroud et al. |
| 2012/0060360 | A1 | 3/2012 | Liu |
| 2012/0082903 | A1 | 4/2012 | Zhang et al. |
| 2012/0082919 | A1 | 4/2012 | Onuma et al. |
| 2012/0125422 | A1 | 5/2012 | Kang et al. |
| 2012/0244447 | A1 | 9/2012 | Suzuki et al. |
| 2013/0025681 | A1 | 1/2013 | Kang et al. |
| 2013/0106029 | A1 | 5/2013 | Snyder et al. |
| 2013/0164604 | A1* | 6/2013 | Matsumoto ............ H01M 4/134 429/163 |
| 2013/0164609 | A1* | 6/2013 | Ito ...................... H01M 10/052 429/200 |
| 2013/0202973 | A1 | 8/2013 | Lane et al. |
| 2013/0224609 | A1 | 8/2013 | Lee et al. |
| 2013/0269781 | A1 | 10/2013 | Ko et al. |

(56) References Cited

U.S. PATENT DOCUMENTS

| | | | |
|---|---|---|---|
| 2014/0017557 A1 | 1/2014 | Lockett et al. | |
| 2014/0017558 A1 | 1/2014 | Lockett et al. | |
| 2014/0017571 A1 | 1/2014 | Lockett et al. | |
| 2014/0125292 A1 | 5/2014 | Best et al. | |
| 2014/0134478 A1 | 5/2014 | Zhao et al. | |
| 2014/0186709 A1 | 7/2014 | Iwanaga et al. | |
| 2014/0299190 A1 | 10/2014 | Eom et al. | |
| 2014/0315096 A1 | 10/2014 | Borges et al. | |
| 2014/0349177 A1 | 11/2014 | Chung et al. | |
| 2014/0377635 A1 | 12/2014 | Matsumoto et al. | |
| 2014/0377644 A1 | 12/2014 | Ishikawa et al. | |
| 2015/0137666 A1* | 5/2015 | Takamatsu | C07C 309/06 310/345 |
| 2015/0194704 A1 | 7/2015 | Garsuch et al. | |
| 2015/0207176 A1* | 7/2015 | Moganty | H01B 1/122 429/50 |
| 2015/0287992 A1 | 10/2015 | Osaka et al. | |
| 2015/0364794 A1 | 12/2015 | Nakazawa et al. | |
| 2016/0013488 A1 | 1/2016 | Kamezaki et al. | |
| 2016/0087306 A1 | 3/2016 | Lee et al. | |
| 2016/0126590 A1 | 5/2016 | Roberts et al. | |
| 2016/0141620 A1 | 5/2016 | Cairns et al. | |
| 2016/0141723 A1 | 5/2016 | Nei et al. | |
| 2016/0141725 A1 | 5/2016 | Young et al. | |
| 2016/0141727 A1 | 5/2016 | Young et al. | |
| 2016/0156062 A1 | 6/2016 | Littau et al. | |
| 2016/0164080 A1 | 6/2016 | Kim et al. | |
| 2016/0164139 A1 | 6/2016 | Ayme-Perrot et al. | |
| 2016/0240885 A1 | 8/2016 | Nishimura | |
| 2016/0294005 A1 | 10/2016 | Lee et al. | |
| 2016/0301107 A1 | 10/2016 | Teran et al. | |
| 2016/0319449 A1 | 11/2016 | Izagirre Etxeberria et al. | |
| 2016/0336625 A1 | 11/2016 | Jeong et al. | |
| 2016/0344035 A1 | 11/2016 | Zhamu et al. | |
| 2016/0351945 A1 | 12/2016 | Suzuki et al. | |
| 2016/0380314 A1 | 12/2016 | Yang et al. | |
| 2017/0040642 A1 | 2/2017 | Ito et al. | |
| 2017/0062829 A1 | 3/2017 | Ryu et al. | |
| 2017/0098858 A1 | 4/2017 | Kim et al. | |
| 2017/0125868 A1 | 5/2017 | Kim et al. | |
| 2017/0133711 A1 | 5/2017 | Gaben | |
| 2017/0133714 A1 | 5/2017 | Ayme-Perrot et al. | |
| 2017/0149106 A1 | 5/2017 | Elia et al. | |
| 2017/0162911 A1 | 6/2017 | Gaben | |
| 2017/0179468 A1 | 6/2017 | Fanous et al. | |
| 2017/0187063 A1 | 6/2017 | Pistorino et al. | |
| 2017/0194633 A1 | 7/2017 | Schumann et al. | |
| 2017/0207448 A1 | 7/2017 | Fanous et al. | |
| 2017/0207484 A1 | 7/2017 | Zhamu et al. | |
| 2017/0207486 A1 | 7/2017 | Wu et al. | |
| 2017/0288269 A1 | 10/2017 | Moganty et al. | |
| 2017/0317352 A1 | 11/2017 | Lee et al. | |
| 2017/0324097 A1 | 11/2017 | Lee et al. | |
| 2017/0330700 A1 | 11/2017 | Tokumaru et al. | |
| 2017/0338474 A1 | 11/2017 | Lee et al. | |
| 2017/0373311 A1 | 12/2017 | Salehi-Khojin et al. | |
| 2018/0000770 A1 | 1/2018 | Novas et al. | |
| 2018/0138554 A1 | 5/2018 | Mukherjee et al. | |
| 2018/0151887 A1 | 5/2018 | Yang et al. | |
| 2018/0183038 A1 | 6/2018 | Yao et al. | |
| 2018/0183052 A1 | 6/2018 | Zhamu et al. | |
| 2018/0230572 A1* | 8/2018 | Turgis | C22B 3/0005 |
| 2018/0269529 A1 | 9/2018 | Yuyama | |
| 2018/0277913 A1 | 9/2018 | Pan et al. | |
| 2018/0284557 A1 | 10/2018 | Kim | |
| 2018/0301756 A1 | 10/2018 | Sakaguchi et al. | |
| 2018/0301759 A1 | 10/2018 | Dubois et al. | |
| 2018/0309125 A1 | 10/2018 | Beidaghi et al. | |
| 2018/0337417 A1 | 11/2018 | Kyu et al. | |
| 2018/0337426 A1 | 11/2018 | Matsumoto et al. | |
| 2018/0342773 A1 | 11/2018 | Singh et al. | |
| 2018/0351196 A1 | 12/2018 | Zhamu et al. | |
| 2018/0375156 A1 | 12/2018 | Zhamu et al. | |
| 2019/0006651 A1 | 1/2019 | Hamon et al. | |
| 2019/0036167 A1 | 1/2019 | Yamaguchi et al. | |

FOREIGN PATENT DOCUMENTS

| | | | |
|---|---|---|---|
| CN | 101037388 A | | 9/2007 |
| CN | 102776053 A | | 11/2012 |
| CN | 103374034 A | | 10/2013 |
| CN | 103374035 | * | 10/2013 |
| CN | 103374035 A | | 10/2013 |
| CN | 103483381 | * | 1/2014 |
| CN | 103483381 A | | 1/2014 |
| CN | 105254667 A | | 1/2016 |
| CN | 105283983 | | 1/2016 |
| CN | 106397499 | | 2/2017 |
| EP | 0168721 | | 1/1986 |
| EP | 1970990 | | 9/2008 |
| EP | 2920832 | | 9/2015 |
| FR | 2753710 | | 3/1998 |
| FR | 3040060 | * | 8/2015 |
| JP | 4537726 | | 9/2010 |
| JP | 2012087135 | | 5/2012 |
| JP | 5557337 | | 7/2014 |
| WO | 2006016733 | | 2/2006 |
| WO | 201003008 | | 1/2010 |
| WO | 20110178554 | | 6/2011 |
| WO | 2017025547 | | 2/2017 |

OTHER PUBLICATIONS

Keglevich et al. "The Phosphorus Aspects of Green Chemistry: the Use of Quaternary Phosphonium Salts and 1, 3-Dialkylimidazolium Hexafluorophosphates in Organic Synthesis" Current Organic Chemistry, 2007, 11, (Year: 2007).*

Karimov et al. Zhurnal Obshei Khimii, 1982, v. 53, No. 2, p. 1181-1185 (Year: 1982).*

Over Grechkin et al Izvestiya Akademii Nauk SSSR, Seriya Khimicheskaya (1975), (5), 1202-3 (Abstract (Year: 1975).*

Karimov et al. Zhurnal Obshei Khimii, 1982, v. 53, No. 2, p. 1181-1185 (Year: 1982) Abstract.*

Yang et. all. :Pyrrolidinium-based ionic liquid electrolyte with organic additive and LiTFSI for high-safety lithium-ion batteries, Electrochimica Acta 148 (2014) 39-45 (Year: 2014).*

Li, Hongyu et al., "Synthesis of pyridine-based task-specific ionic liquid with alkyl phosphate cation and extraction performance for uranyl ion," Ionics, 2015, vol. 21, pp. 2551-2556.

Li, Hangyu et al., "Task-specific ionic liquids incorporating alkyl phosphate cations for extraction of U(VI) from nitric acid medium; synthesis, characterization, and extraction performance," J. Radioanal. Nucl. Chem., 2015, vol. 303, pp. 433-440.

PCT International Search Report, Form PCT/ISA/210, International Application No. PCT/US18/042543, International filing date Jul. 17, 2018, dated Sep. 27, 2018.

TCI America, Product No. T0460, Product Name Trilauryl trithiophosphite; www.trichemicals.com; printed Dec. 10, 2019.

Mai, Shaowei, et al., Tris(trimethlsilyl)phosphite as electrolyte additive for high voltage layered lithium nickel cobalt manganese oxide cathode of lithium ion battery, Ecectrochimica Acta, vol. 147, Nov. 20, 2014, pp. 565-571 (abstract provided).

Han, Yount-Kyu, et al., Why is tris(trimethylsilyl) phosphite effective as an additive for high-voltage lithium-ion batteries?, Journal of Materials Chemistry A, Issue 20, 2015 (Abstract provided).

Zhou, Zhenxin, et al., Triphenyl phosphite as an electrolyte additive to improve the cyclic stability of lithium-rich layered oxide cathode for lithium-ion batteries, Electrochima Acta, vol. 216, Oct. 20, 2016, pp. 44-60 (Abstract provided).

Qi, Xin, et al., Lifetime limit of tris(trimethylsilyl) phosphite as electrolyte additive for high voltage lithium ion batteries, RCS Advances, Issue 44, 2016 (Abstract provided).

Pires, Julie, et al., Tris (2,2,2-trifluoroethyl) phosphite as an electrolyte additive for high-voltage lithium-ion batteries using lithium-rich layered oxide cathode, Journal of Power Sources, 296, 2015, pp. 413-425.

Braun, Richard, et al., Click Chemistry Mediated Synthesis of Bio-Inspired Phosphonyl-Functionalized Ionic Liquids, Green Chem., vol. 17, Nov. 26, 2014, pp. 1259-1268.

(56) References Cited

OTHER PUBLICATIONS

Floch, Virginie, et al., Cation Substitution in Cationic Phosphonolipids: A New Concept to Improve Transfection Activity and Decrease Cellular Toxicity, J. Med. Chem., vol. 43, 2000, pp. 4617-4628.

Quadi, Ali, et al., Solvent Extraction of U(VI) by Task Specific Ionic Liquids Bearing Phosphoryl Groups, Green Chem., vol. 9, Jul. 30, 2007, pp. 1160-1162.

Renshaw, R.R., et al., Phosphoric Acid Ester Derivatives of Choline. Basis for the Physiological Activity of-Onium Compounds., Phosphoric Acid Derivatives of Choline, vol. 51, Mar. 6, 1929, pp. 953-954.

Supplementary Partial European Search Report, EPO Form 1507US, International Application No. PCT/US17/025464, dated Oct. 29, 2019.

Extended European Search Report for European Application No. 17776813.2; dated Feb. 25, 2020; 17 pages.

PCT International Search Report, Form PCT/ISA/210, International application No. PCT/US17/25464, International filing date Mar. 31, 2017, dated Jul. 3, 2017.

Keglevich et al. The phosphorus aspects of green chemistry: the use of quarternary phosphonium salts and 1,3-dialkylimidazolium hexafluorophosphates in organic synthesis. Current Organic Chemistry, 2007, 11, 107-126.

Cheng et al., Improved dye-sensitized solar cells by composite ionic liquid electrolyte incorporating layered titanium phosphate.

Jiménez et al., Surface coating from phosphonate ionic liquid electrolyte for the enhancement of the tribiological performance of magnesium alloy, ACS Appl. Mater. Interfaces, 2015, 7(19):10337-10347.

* cited by examiner

MODIFIED IONIC LIQUIDS CONTAINING PHOSPHORUS

CROSS REFERENCE

This application claims the benefit of the filing date of U.S. Provisional Patent Application Ser. No. 62/317,025, filed Apr. 1, 2016, which is hereby incorporated by reference in its entirety.

FIELD

This disclosure is directed towards an ionic liquid whose cation includes a phosphorus moiety and an electrolyte for electrochemical cells containing the ionic liquid.

BACKGROUND

Recent progress in synthesis and electrochemical analysis of room temperature ionic liquids (ILs) has established the promise of this unique class of materials as electrolytes for next-generation lithium-ion batteries. ILs are organic salts having melting points below 100° C. and generally consist of a bulky cation and an inorganic anion. The large cation size allows for delocalization and screening of charges, resulting in a reduction in the lattice energy and thereby the melting point or glass transition temperature. ILs have unique physicochemical properties, such as negligible vapor pressure, non-flammability, good room-temperature ionic conductivity, a wide electrochemical window, and favorable chemical and thermal stability. These properties are desirable for providing IL-based electrolytes for lithium batteries.

However, there are still safety challenges such as flammability of lithium-ion batteries under abuse conditions or even normal conditions. U.S. Pat. No. 5,830,600 to Narang et al. teaches the use of a flame retardant electrolyte composition containing a phosphate-based non-aqueous solvent, but mentions no use of an ionic liquid. Therefore, there is a need to incorporate a novel ionic liquid with flame retardant capabilities into lithium ion batteries.

SUMMARY

The present disclosure is directed towards an ionic liquid, including anions and cations, wherein the cations have at least one phosphorus moiety.

In accordance with one aspect of the present disclosure, there is provided an electrolyte for use in an electrical storage device, the electrolyte includes an aprotic organic solvent, an alkali metal salt, an additive and an ionic liquid compound that contains at least one phosphorus moiety.

In accordance with another aspect of the present disclosure, there is provided an electrolyte in an electrical energy storage device, the electrolyte includes an aprotic organic solvent, an alkali metal salt, an additive and an ionic liquid compound that contains at least one phosphorus moiety, wherein the organic solvent is open-chain or cyclic carbonates, carboxylic acid esters, nitrites, ethers, sulfones, sulfoxides, ketones, lactones, dioxolanes, glymes, crown ethers, siloxanes, phosphoric acid esters, phosphates, phosphites, mono- or polyphosphazenes or mixtures thereof.

In accordance with another aspect of the present disclosure, there is provided an electrolyte in an electrical energy storage device, the electrolyte includes an aprotic organic solvent, an alkali metal salt, an additive and the ionic liquid compound that contains at least one phosphorus moiety, wherein the cation of the alkali metal salt is lithium, sodium, aluminum or magnesium.

In accordance with another aspect of the present disclosure, there is provided an electrolyte in an electrical energy storage device, the electrolyte including an aprotic organic solvent, an alkali metal salt, an additive and an ionic liquid compound that contains at least one phosphorus moiety, wherein the additive contains sulfur-containing compounds, phosphorus-containing compounds, boron-containing compounds, silicon-containing compounds, compounds containing at least one unsaturated carbon-carbon bond, carboxylic acid anhydrides or mixtures thereof.

These and other aspects of the present disclosure will become apparent upon a review of the following detailed description and the claims appended thereto.

DETAILED DESCRIPTION

Figure 1:
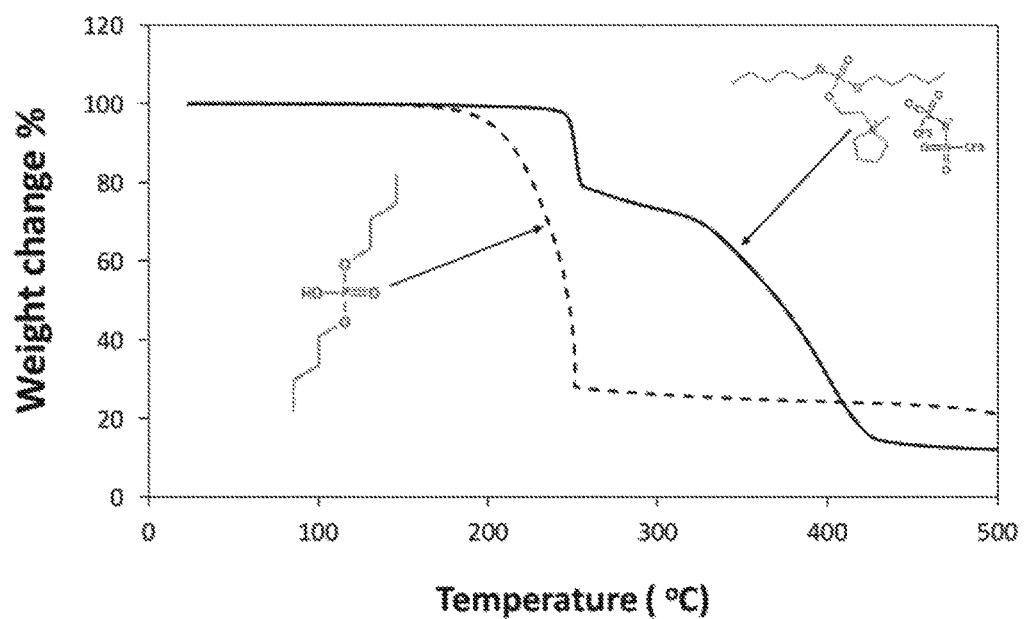
FIG. 1 illustrates a thermogravimetric comparison between dibutylphosphate and quaternized dibutylphosphate-ethylpyrrolidine.

The present disclosure is directed towards an ionic liquid compound including at least one cation and at least one anion, wherein the at least one cation is covalently bonded to at least one phosphorus moiety ionic.

In an embodiment, an electrical energy storage device electrolyte includes a) an aprotic organic solvent system; b) an alkali metal salt; c) an additive; and d) an ionic liquid compound including at least one cation and an at least one anion, wherein at least one cation is covalently bonded to at least one phosphorus moiety.

In an embodiment, an ionic liquid compound includes an anion; and a cation attached to a phosphorus moiety according to the formula:

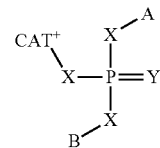

wherein: A is a CAT$^+$ or R$_1$; B is a CAT$^+$ or R$_2$; CAT$^+$ is a pyrrolidinium, piperdinium, azepanium, onium, sulfonium, phosphonium, imidazolium, pyridine or a 5- or 6-membered heterocyclic ring having 1 to 3 heteroatoms as ring members including nitrogen, oxygen, silicon or sulfur; R$_1$ and R$_2$ are independently a C$_1$-C$_8$ alkyl, alkenyl, alkoxy, aryl, alkynyl, alkylsiloxy, phenyl, benzyl, silyl, thioether, sulfoxide, azo, amino or silane group, wherein any of the carbon or hydrogen atoms therein are optionally further substituted with a halide, alkyl, alkenyl, alkoxy, aryl, alkynyl, alkylsiloxy, phenyl, benzyl, silyl, thioether, sulfoxide, azo, amino or silane; Y is O, S or N, with the proviso that when Y is O, CAT$^+$ is not an imidazolium or a pyridine; and X is (a) a linker, including a C$_1$-C$_8$ alkyl, alkenyl, alkynyl, alkoxy, ester, carbonyl, phenyl, thioether, sulfoxide, azo or aryl group, wherein any of the carbon or hydrogen atoms therein are optionally further substituted with a halide; (b) O, S, N, or C; or (c) O, S, N, or C attached to the linker.

In an embodiment, an ionic liquid compound includes an anion; and a cation attached to a phosphorus moiety according to the formula:

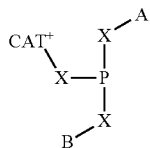

wherein: A is a $CAT^+$ or $R_1$; B is a $CAT^+$ or $R_2$; $CAT^+$ is a pyrrolidinium, piperdinium, azepanium, onium, sulfonium, phosphonium, imidazolium, pyridine or a 5- or 6-membered heterocyclic ring having 1 to 3 heteroatoms as ring members comprising nitrogen, oxygen, silicon or sulfur; $R_1$ and $R_2$ are independently a $C_1$-$C_8$ alkyl, alkenyl, alkoxy, aryl, alkynyl, alkylsiloxy, phenyl, benzyl, silyl, thioether, sulfoxide, azo, amino or silane group, wherein any of the carbon or hydrogen atoms therein are optionally further substituted with a halide, alkyl, alkenyl, alkoxy, aryl, alkynyl, alkylsiloxy, phenyl, benzyl, silyl, thioether, sulfoxide, azo, amino or silane; and X is (a) a linker, comprising a $C_1$-$C_8$ alkyl, alkenyl, alkynyl, alkoxy, ester, carbonyl, phenyl, thioether, sulfoxide, azo or aryl group, wherein any of the carbon or hydrogen atoms therein are optionally further substituted with a halide; (b) O, S, N, or C; or (c) O, S, N, or C attached to the linker.

Suitable anions in accordance with the present disclosure, include but are not limited to halides (e.g., Cl, Br), nitrates (e.g., $NO_3$), phosphates (e.g., $PF_6$, TFOP), imides (e.g., TFSI, BETI), borates (e.g., BOB, $BF_4$), aluminates, arsenides, cyanides, thiocyanates, nitrites, benzoates, carbonates, chlorates, chlorites, chromates, sulfates, sulfites, silicates, thiosulfates, chalcogenides, pnictogenides, crystallogenides, oxalates, acetates, formates, or hydroxides.

The disclosure further includes a method for synthesizing the phosphorus cations, and the use of such functionalized cations in an ionic liquid for electrochemical cells. These compounds afford the electrolyte greater thermal stability.

Typically, to first synthesize a phosphorus-cationic salt, the synthesis reaction is carried out with or without a catalyst in the presence of an organic compound. Suitable organic compounds include a substituted or unsubstituted alkyl group, for example, N-alkyl-N-alkyl pyrrolidine, N-alkyl-N-alkyl pyridine, N-alkyl-N-alkyl imidazoline, N-alkyl-N-alkyl phosphine, N-alkyl-N-alkyl sulfone, N-alkyl-N-alkyl amine or N-alkyl-N-alkyl piperidine.

The synthesis reaction is also preferably carried out in the presence of a base. Suitable bases include: an alkali metal carbonate, such as sodium carbonate, potassium carbonate or lithium carbonate; an alkali metal alkoxide, such as sodium alkoxide, potassium alkoxide or lithium alkoxide; an alkali metal methoxide, an alkali metal ethoxide; an alkali metal propoxide or an alkali metal butoxide, such as sodium methoxide, potassium methoxide, lithium methoxide, sodium ethoxide, potassium ethoxide, lithium ethoxide, sodium propoxide, potassium propoxide, lithium propoxide, sodium t-butoxide, potassium t-butoxide, lithium t-butoxide, sodium hydride, potassium hydride, pyridine, triethylamine, N,N-diethylamine, N,N-diisopropylamine, N,N-diisopropylethylamine (Hunig's base), 1,8-diazabicyclo[5.4.0]undec-7-ene (DBU), 1,5-diazabicyclo[4.3.0]non-5-ene (DBN) or 1,4-diazabicyclo[2.2.2]octane (DABCO); $KHCO_3$; $NaHCO_3$; $BaCO_3$; $CaCO_3$; $Cs_2CO_3$; $MgCO_3$; KOH; NaOH and LiOH. A preferred base is sodium carbonate or potassium carbonate.

The synthesis reaction is also carried out in the presence of an organic solvent. Examples of the organic solvent are: dichloromethane, tetrahydrofuran, toluene, chloroform, acetonitrile, methyl acetate, ethyl acetate, isopropyl acetate, propyl acetate, butyl acetate, acetone, methyl isobutyl ketone, methyl ethyl ketone, 1,2-dimethyoxyethane, 2-methyltetrahydrofuran, 1,4-dioxane, methyl t-butyl ether (MTBE), chlorobenzene, xylenes, heptane, hexanes, cyclohexane, cyclohexanone, DMF, dimethyl sulfoxide, N-methylpyrrolidinone, MTBE, methanol, ethanol, isopropanol, n-propanol, n-butanol, t-butanol and ethylene glycol. A preferred solvent is dichloromethane or tetrahydrofuran.

The organic solvent is employed in an amount within the range from about 3 mL/g to about 15 mL/g of reaction mixture of the phosphate and the organic compound, preferably from about 5 mL/g to about 10 mL/g reaction mixture of the phosphorus of the organic compound.

The reaction of the phosphorus and the organic compound is carried out under relatively mild conditions at a temperature within the range from about 10° C. to about 30° C., preferably from about 15° C. to about 25° C., for a period to ensure yields of at least about 85%, and yields of 88 to 92%, and >90% potency.

The reaction is additionally carried out in the presence of water in an amount within the range from about 3 mL/g to about 15 mL/g reaction mixture of the phosphate of the organic compound, preferably from about 5 mL/g to about 10 mL/g reaction mixture of the phosphorus of the organic compound.

The phosphorus-modified organic compound is quaternized in the presence of methyl iodide and a solvent; suitable solvents include dichloromethane, tetrahydrofuran, toluene, chloroform, acetonitrile, methyl acetate, ethyl acetate, isopropyl acetate, propyl acetate, butyl acetate, acetone, methyl isobutyl ketone, methyl ethyl ketone, 1,2-dimethyoxyethane, 2-methyltetrahydrofuran, 1,4-dioxane, methyl t-butyl ether (MTBE), chlorobenzene, xylenes, heptane, hexanes, cyclohexane, cyclohexanone, DMF, dimethyl sulfoxide, N-methylpyrrolidinone, MTBE, methanol, ethanol, isopropanol, n-propanol, n-butanol, t-butanol and ethylene glycol, preferably acetonitrile. The resultant phosphate-organic cation then undergoes metathesis in the presence of a lithium salt.

In a preferred embodiment, the phosphorus compound is dibutylphosphate and the organic compound is N-(2-chloroethyl) pyrrolidine. Most preferably, the pyrrolidine is attached to one dibutylphospate and quaternized to dibutylphosphate ethyl pyrrolidinium.

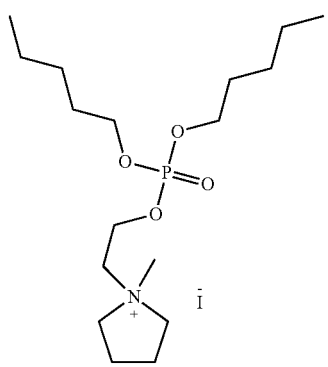

In the present disclosure, an electrolyte includes a thermally stable ionic liquid, an alkali metal, such as lithium, an additive and an aprotic solvent for use in an electrochemical cell. The ionic liquid contains an organic cation and an inorganic/organic anion, with the organic cation being N-alkyl-N-alkyl-pyrrolidinium, N-alkyl-N-alkyl-pyridnium, N-alkyl-N-alkyl-sulfonium, N-alkyl-N-alkyl-ammonium, N-alkyl-N-alkyl-piperdinium or the like, and the anion being tetrafluoroborate, hexafluorophosphate, bis(trifluoromethylsulfonyl)imide, bis(pentafluoroethylsulfonyl)imide, trifluoroacetate or the like. The polymer in the electrolyte includes poly(ethylene glycol) derivatives, with varying molecular weights ranging from about 150 g/mol to about 10,000,000 g/mol. Suitable aprotic solvents include carbonates, ethers, acetamides, acetonitrile, symmetric sulfones, 1,3-dioxolanes, dimethoxyethanes, glymes, siloxanes and their blends. The alkali metal salt can be $LiBF_4$, $LiNO_3$, $LiPF_6$, $LiAsF_6$, lithium bis(trifluoromethylsulfonyl)imide (LiTFSI), lithium bis(pentafluoroethylsulfonyl)imide, lithium trifluoroacetate, or a similar compound.

In some embodiments, the electrolyte includes a lithium salt in addition to the ionic liquid. A variety of lithium salts may be used, including, for example. $Li[CF_3CO_2]$; $Li[C_2F_5CO_2]$; $Li[ClO_4]$; $Li[BF_4]$; $Li[AsF_6]$; $Li[PF_6]$; $Li[PF_2(C_2O_4)_2]$; $Li[PF_4C_2O_4]$; $Li[CF_3SO_3]$; $Li[N(CP_3SO_2)_2]$; $Li[C(CF_3SO_2)_3]$; $Li[N(SO_2C_2F_5)_2]$; lithium alkyl fluorophosphates; $Li[B(C_2O_4)_2]$; $Li[BF_2C_2O_4]$; $Li_2[B_{12}Z_{12-j}H_j]$; $Li_2[B_{10}X_{10-j'}H_{j'}]$; or a mixture of any two or more thereof, wherein Z is independent at each occurrence a halogen, j is an integer from 0 to 12 and j' is an integer from 1 to 10.

In some applications of the present electrolyte, such as a formulation for a lithium ion battery, aprotic solvents are combined with the present ionic liquids to decrease the viscosity and increase the conductivity of the electrolyte. The most appropriate aprotic solvents lack exchangeable protons, including cyclic carbonic acid esters, linear carbonic acid esters, phosphoric acid esters, oligoether substituted siloxanes/silanes, cyclic ethers, chain ethers, lactone compounds, chain esters, nitrile compounds, amide compounds, sulfone compounds, siloxanes, phosphoric acid esters, phosphates, phosphites, mono- or polyphosphazenes and the like. These solvents may be used singly, or at least two of them in admixture. Examples of aprotic solvents or carriers for forming the electrolyte systems include but are not limited to dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, methyl propionate, ethyl propionate, butyl propionate, dimethoxyethane, triglyme, dimethylvinylene carbonate, tetraethyleneglycol, dimethyl ether, polyethylene glycols, triphenyl phosphate, tributyl phosphate, hexafluorocyclotriphosphazene, 2-Ethoxy-2,4,6,6-pentafluoro-1,3,5,2-5,4-5,6-5 triazatriphosphinine, triphenyl phosphite, sulfolane, dimethyl sulfoxide, ethyl methyl sulfone, ethylvinyl sulfone, allyl methyl sulfone, divinyl sulfone, fluorophynelmethyl sulfone and gamma-butyrolactone.

In some embodiments, the electrolytes further include an additive to protect the electrodes from degradation. Thus, electrolytes of the present technology may include an additive that is reduced or polymerized on the surface of a negative electrode to form a passivation film on the surface of the negative electrode. Likewise, electrolytes can include an additive that can be oxidized or polymerized on the surface of the positive electrode to form a passivation film on the surface of the positive electrode. In some embodiments, electrolytes of the present technology further include mixtures of the two types of additives.

In some embodiments, an additive is a substituted or unsubstituted linear, branched or cyclic hydrocarbon including at least one oxygen atom and at least one aryl, alkenyl or alkynyl group. The passivating film formed from such additives may also be formed from a substituted aryl compound or a substituted or unsubstituted heteroaryl compound where the additive includes at least one oxygen atom. Alternatively, a combination of two additives may be used. In some such embodiments, one ions and the other additive can be selective for passivating the anode surface to prevent or lessen the reduction of metal ions at the anode.

Representative additives include glyoxal bis(diallyl acetal), tetra(ethylene glycol) divinyl ether, 1,3,5-triallyl-1,3,5-triazine-2,4,6(1H,3H,5H)-trione, 1,3,5,7-tetravinyl-1,3,5,7-tetramethylcyclotetrasiloxane, 2,4,6-triallyloxy-1,3,5-triazine, 1,3,5-triacryloylhexahydro-1,3,5-triazine, 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2-amino-3-vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3 vinylaziridin-2-one, 3-vinylcyclobutanone, 3-vinylcyclopentanone, 3-vinyloxaziridine, 3-vinyloxetane, 3-vinylpyrrolidin-2-one, 2-vinyl-1,3-dioxolane, acrolein diethyl acetal, acrolein dimethyl acetal, 4,4-divinyl-3-dioxolan-2-one, 4-vinyltetrahydropyran, 5-vinylpiperidin-3-one, allylglycidyl ether, butadiene monoxide, butyl-vinyl-ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, Pf-vinyl-γ-butyrolactone or a mixture of any two or more thereof. In some embodiments, the additive may be a cyclotriphosphazene that is substituted with F, alkyloxy, alkenyloxy, aryloxy, methoxy, allyloxy groups or combinations thereof. For example, the additive may be a (divinyl)-(methoxy)(trifluoro)cyclotriphosphazene, (trivinyl)(difluoro)methoxy)cyclotriphosphazene, (vinyl)(methoxy)tetrafluoro)cyclotriphosphazene, (aryloxy)tetrafluoro)(methoxy)cyclotriphosphazene or (diaryloxytrifluoroXmethoxy)cyclotriphosphazene compounds or a mixture of two or more such compounds. In some embodiments, the additive is vinyl ethylene carbonate, vinyl carbonate, or 1,2-diphenyl ether, or a mixture of any two or more such compounds.

Other representative additives include compounds with phenyl, naphthyl, anthracenyl, pyrrolyl, oxazolyl, furanyl, indolyl, carbazolyl, imidazolyl, thiophenyl, fluorinated carbonates, sultone, sulfide, anhydride, silane, siloxy, phosphate or phosphite groups. For example, additives may be phenyl trifluoromethyl sulfide, fluoroethylene carbonate, 1,3,2-dioxathiolane 2,2-dioxide, I-propene 1,3-sultone, 1,3-propanesultone, 1,3-dioxolan-2-one, 4-[(2,2,2-trifluoroethoxy)methyl], 1,3-dioxolan-2-one, 4-[[2,2,2-trifluoro-1-(trifluoromethyl)ethoxy]methyl]-, methyl 2,2,2-trifluoroethyl carbonate, nonafluorohexyltriethoxysilane, octamethyltrisiloxane, methyltris(trimethylsiloxy)silane, tetrakis(trimethylsiloxy)silane, (tridecafluoro-1,1,2,2-tetrahydrooctyl)triethoxysilane, tris(1H,1H-heptafluorobutyl)phosphate, 3,3,3-trifuoropropyltris(3,3,3-trifluoropropyldimethylsiloxy) silane, (3,3,3-trifluoropropyl)trimethoxysilane, trimethylsilyl trifluoromethanesulfonate, tris(trimethylsilyl) borate, tripropyl phosphate, bis(trimethylsilylmethyl)benzylamine, phenyltris(trimethylsiloxy)silane, 1,3-bis(trifluoropropyl)tetramethyldisiloxane, triphenyl phosphate, tris(trimethylsilyl)phosphate, tris(1H,1H,5H-octafluoropentyl) phosphate, triphenyl phosphite, trilauryl trithiophosphite, tris(2,4-di-tert-butylphenyl) phosphite, tri-p-tolyl phosphite, tris(2,2,3,3,3-pentafluoropropyl)phosphate, succinic anhydride, 1,5,2,4-dioxadithiane 2,2,4,4-tetraoxide, tripropyl trithiophosphate, aryloxpyrrole, aryloxy ethylene sulfate, aryloxy pyrazine, aryloxy-carbazole trivinylphosphate, aryloxy-ethyl-2-furoate, aryloxy-o-terphenyl, aryloxy-pyridazine, butyl-aryloxy-ether, divinyl diphenyl ether, (tetrahydrofuran-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4 divinyl-1-methyl pyrrole, aryloxyoxetane, aryloxyphenyl carbonate, aryloxy-piperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxyquinoline, diaryloxycyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o terphenyl, N-methyl pyrrole, naphthalene or a mixture of any two or more such compounds.

In some other embodiments, the electrolyte of the present technology includes an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, cross-linked and network structures of the foregoing, blends of the foregoing and the like, to which is added a suitable ionic electrolyte salt. Other gel-polymer carrier/ solvents include those prepared from polymer matrices derived from polypropylene oxides, polysiloxanes, sulfonated polyimides, perfluorinated membranes (Nafion resins), divinyl polyethylene glycols, polyethylene glycol-bis-(methyl acrylates), polyethylene glycol-bis(methyl methacrylates), derivatives of the foregoing, copolymers of the foregoing and cross-linked and network structures of the foregoing.

The functional ionic liquids and the electrolytic solution containing the salt are high in electrical conductivity and solubility in organic solvents, and are suitable for use as an electrolytic solution for electrochemical devices. Examples of electrochemical devices are electric double-layer capacitor, secondary batteries, solar cells of the pigment sensitizer type, electrochromic devices and condensers, and this list is not limitative. Especially suitable as electrochemical devices are electric double-layer capacitor and secondary batteries, such as a lithium ion battery.

In yet another aspect, an electrochemical device is provided that includes a cathode, an anode and an electrolyte including an ionic liquid as described herein. In one embodiment, the electrochemical device is a lithium secondary battery. In some embodiments, the secondary battery is a lithium battery, a lithium-ion battery, a lithium-sulfur battery, a lithium-air battery, a sodium ion battery or a magnesium battery. In some embodiments, the electrochemical device is an electrochemical cell, such as a capacitor. In some embodiments, the capacitor is an asymmetric capacitor or supercapacitor. In some embodiments, the electrochemical cell is a primary cell. In some embodiments, the primary cell is a lithium/$MnO_2$ battery or Li/poly(carbon monofluoride) battery. In some embodiments, the electrochemical cell is a solar cell.

Suitable cathodes include those such as, but not limited to, a lithium metal oxide, spinel, olivine, carbon-coated olivine, $LiFePO_4$, $LiCoO_2$, $LiNiO_2$, $LiNi_{1-x}Co_yMet_zO_2$, $LiMn_{0.5}Ni_{0.3}O_2$, $LiMn_{0.3}Co_{0.3}Ni_{0.3}O_2$, $LiMn_2O_4$, $LiFeO_2$, $Li_{1+x}Ni_\alpha Mn_\beta Co_\gamma Met'_\delta O_{2-z}F_{z'}$, $A_n.B_2(XO_4)$; (NASICON), vanadium oxide, lithium peroxide, sulfur, polysulfide, a lithium carbon monofluoride (also known as LiCFx) or mixtures of any two or more thereof, where Met is Al, Mg, Ti, B, Ga, Si, Mn or Co; Met' is Mg, Zn, Al, Ga, B, Zr or Ti; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, $0 \leq z \leq 0.5$, $0 \geq x' \leq 0.4$, $0 \leq \alpha \leq 1$, $0 \leq \beta \leq 1$, $0 \leq \gamma \leq 1$, $0 \leq \delta \leq 0.4$, $0 \leq z' \leq 0.4$ and $0 \leq h' \leq 3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. In other embodiments, the olivine has a formula of $Li_{1+x}Fe_{1z}Met''_yPO_{4-m}X'_n$, wherein Met'' is Al, Mg, Ti, B, Ga, Si, Ni, Mn or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

Suitable anodes include those such as lithium metal, graphitic materials, amorphous carbon, $Li_4Ti_5O_{12}$, tin alloys, silicon alloys, intermetallic compounds or mixtures of any two or more such materials. Suitable graphitic materials include natural graphite, artificial graphite, graphitized meso-carbon microbeads (MCMB) and graphite fibers, as well as any amorphous carbon materials. In some embodiments, the anode and cathode are separated from each other by a porous separator.

The separator for the lithium battery often is a microporous polymer film. Examples of polymers for forming films include: nylon, cellulose, nitrocellulose, polysulfone, polyacrylonitrile, polyvinylidene fluoride, polypropylene, polyethylene, polybutene, or copolymers or blends of any two or more such polymers. In some instances, the separator is an electron beam-treated micro-porous polyolefin separator. The electron treatment can improve the deformation temperature of the separator and can accordingly enhance the high temperature performance of the separator. Additionally, or alternatively, the separator can be a shut-down separator. The shut-down separator can have a trigger temperature above about 130° C. to permit the electrochemical cells to operate at temperatures up to about 130° C.

The disclosure will be further illustrated with reference to the following specific examples. It is understood that these examples are given by way of illustration and are not meant to limit the disclosure or the claims to follow.

Example 1

Synthesis of phosphate functional ionic liquids.

A) Synthesis of dibutyl 2-1(-pyrolidinyl)ethyl phosphate According to Table 1.

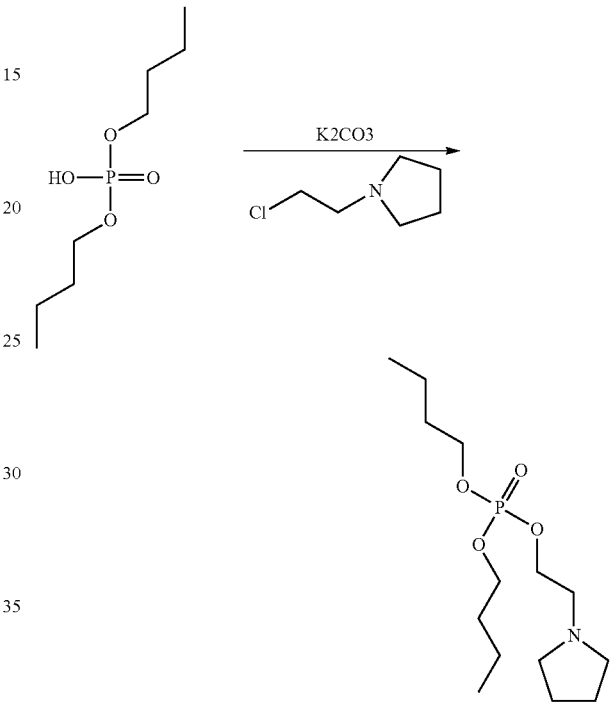

TABLE 1

| Reagent | MW | Equiv | Mol | Mass (g) | Density | Volume (mL) | Conc | Yield (calc) |
|---|---|---|---|---|---|---|---|---|
| dibutylphosphate | 210.21 | 1.00 | 0.067 | 14.0 | 1.060 | 13.2 | | |
| N-(2-chloroethyl)pyrrolidine | 133.62 | 1.00 | 0.067 | 8.9 | | 8.9 | | 8.9 |
| DCM | | | | 38.2 | 1.33 | 28.8 | 60% | |
| $K_2CO_3$ | 138.21 | 1.05 | 0.070 | 9.7 | | | | |
| Dibutylphosphate-ethylpyrrolidine | 307.33 | 1.00 | 0.000 | | | | | 20.5 |
| KCl | 74.55 | 1.00 | | | | | | 4.97 |
| $KHCO_3$ | 100.11 | 1.00 | | | | | | 6.67 |

Potassium carbonate, dichloromethane (DCM), dibutylphosphate and N-(2-chloroethyl)pyrrolidine (prepared by regenerating the free amine from N-(2-chloroethyl)pyrrolidine-HCl) were added to a 250 mL flask equipped with a magnetic stirring bar. A slight exotherm was observed. The mixture was stirred at room temperature and the overall reaction time was four days.

During the reaction, potassium carbonate was gradually consumed as it scavenged the liberated HCl to form potassium chloride and potassium bicarbonate, approximately 11.6 g.

DCM (60 mL) and DI water (60 mL) were added to the reaction mixture and the organic phase was extracted. The solvent was removed by rotary evaporation. Yield: dark amber oil, 7.7 g (38%).

H$^+$ NMR: (CDCl3) δ ppm 4.15 (q, 2H), 4.05 (q, 4H), 2.78 (t, 2H), 2.57 (m, 4H), 1.78 (m, 4H), 1.67 (q, 4H), 1.41 (s, 4H), 0.94 (t, 6H).

B) Synthesis of Phosphate Functional Pyrrolidium and Ionic Liquid Containing Thereof According to Table 2.

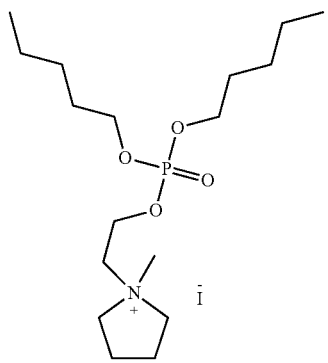

capped bottle equipped with a magnetic stirring bar as two separate solutions, each dissolved in 30 mL DI water. A cloudy precipitate quickly formed, after which, a dense amber layer deposited on the bottom of the flask. The mixture was stirred at room temperature for 20 min.

The water layer was decanted, DCM (20 mL) was added and the entire mixture was poured into a separatory funnel. The organic layer was washed with DI water (2×20 mL), separated, dried over MgSO$_4$, filtered and the solvent was removed by rotary evaporation. The oil was pumped under high vacuum for two hours and dried under vacuum (5 mbar, 60° C.). Yield: dark amber oil, 13.7 g (93%).

Characterization.

H$^+$ NMR: (CDCl3) δ ppm 4.44 (t, 2H), 4.08 (q, 4H), 3.76 (t, 2H), 3.64 (m, 4H), 3.15 (s, 3H), 2.29 (m, 4H), 1.68 (q, 4H), 1.41 (s, 4H), 0.95 (s, 6H). F$^{19}$ NMR: (CDCl3) δ ppm −79.0.

Example 2

The thermal stability of the pyrrolidinium cation-appended dibutylphosphate functional ionic liquid and the thermal stability of dibutylphosphate, a comparative example, were compared using thermogravimetric analysis, wherein the measurement was conducted at a 10° C./min scan rate from room temperature.

FIG. 1 shows the weight change as a function of temperature. As shown in FIG. 1, dibutylphosphate underwent close to 80% weight loss at about 250° C., while the ionic liquid containing the dibutylphosphate pyrrolidinium cation experienced only a 20% weight loss at 250° C. The novel ionic liquid clearly exhibited improved thermal stability compared to nonionic dibutylphosphate.

TABLE 2

| Reagent | MW | Equiv | Mol | Mass (g) | Density | Volume (mL) | Conc | Yield (calc) |
|---|---|---|---|---|---|---|---|---|
| dibutylphosphate-ethylpyrrolidine | 307.33 | 1.00 | 0.025 | 7.7 | | 7.7 | | |
| methyl iodide | 141.94 | 1.00 | 0.025 | 3.6 | 2.28 | 1.6 | | |
| acetonitrile | | | | 14.1 | 0.786 | 17.9 | 80% | |
| Pyr12DBP-I | 449.27 | 1.00 | 0.024 | 11.0 | | | | 11.3 |
| DI water | | | | 46.0 | 1.00 | 46.0 | 40% | |
| LiTFSI | 287.09 | 1.05 | 0.026 | 7.4 | | | | |
| Pyr12DBP-TFSI | 602.51 | | | | | | | 14.8 |

Quaternization.

Dibutylphosphate-ethylpyrrolidine and acetonitrile were added to a 250 mL 3-neck flask equipped with a magnetic stirring bar, water-cooled condenser, N$_2$ inlet and thermocouple. The mixture was stirred at room temperature.

While stirring, methyl iodide was added to the mixture dropwise by syringe and the internal temperature was monitored for evidence of exotherm. The temperature was maintained under 30° C. After the addition was completed, the mixture was heated to 40° C. for one hour. The overall reaction time was three hours.

The mixture was cooled to room temperature and the solvent was removed via rotary evaporation. Yield: dark amber oil, 11.0 g (97%).

Metathesis (TFSI)

The resultant iodide salt from step 1 and lithium bis(trifluoromethylsulfonyl)imide were added to a 100 mL Example 3

Phosphate functional ionic liquid electrolyte in an electrochemical device.

Electrolyte formulations were prepared in a dry argon filled glovebox by combining all the electrolyte components in a vial and stirring for 24 hours to ensure complete dissolution of the salts. The phosphate functional ionic liquid is added as an additive to a base electrolyte formulation comprising a 3:7 by weight mixture of ethylene carbonate, "EC", and ethyl methyl carbonate, "EMC", with 1 M lithium hexafluorophosphate, "LiPF$_6$", dissolved therein. The electrolyte formulations prepared are summarized in Table 3.

TABLE 3

Electrolyte formulations.

| Electrolyte | Base | Ionic liquid Additive (15 wt. %) |
|---|---|---|
| 1 | 1M Li PF$_6$; EC:EMC; 3:7 w/w | NONE |
| 2 | 1M Li PF$_6$; EC:EMC; 3:7 w/w | [structure: methylpyrrolidinium cation with ethyl-O-P(=O)(OPh)(OPh) phosphate group; TFSI⁻ anion] |
| 3 | 1M Li PF$_6$; EC:EMC; 3:7 w/w | [structure: bis(methylpyrrolidinium-ethyl) phenyl phosphate; 2 TFSI⁻ anions] |
| 4 | 1M Li PF$_6$; EC:EMC; 3:7 w/w | [structure: tris(methylpyrrolidinium-ethoxy)phosphine oxide; TFSI⁻] |

Figure 2:
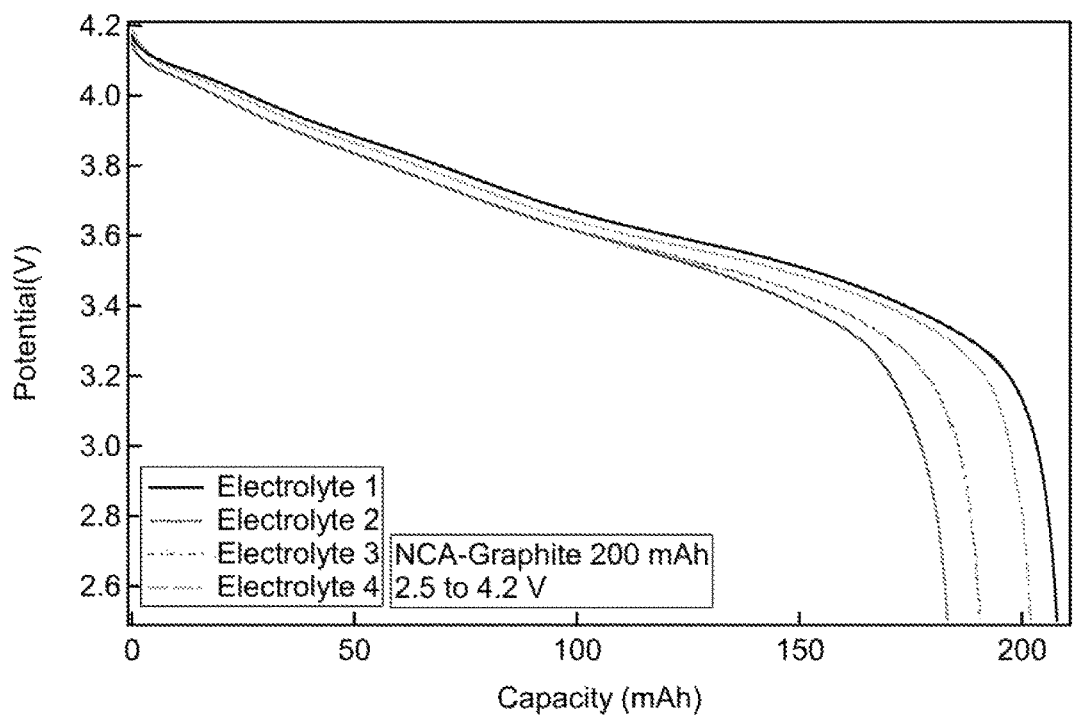
FIG. 2 is a graph of discharge profiles of cells containing ionic liquid electrolytes in accordance with the present disclosure.

The electrolyte formulations prepared are used as the electrolyte in 40 mm×20 mm×35 mm Li-ion polymer pouch cells including Lithium nickel cobalt aluminum oxide cathode active material and graphite as the anode active material. In each cell 1.1 g of electrolyte formulation is added and allowed to soak in the cell for 1 hour prior to vacuum sealing and testing. The cells were then charged to 4.2 V and discharged to 2.5 V at a C/15 rate for the first cycles, and C/5 onwards. The cells have a nominal capacity of 200 mAh at C/5. In FIG. 2, the first discharge voltage profiles attributed to each electrolyte is demonstrated.

FIG. 2 shows discharge profiles of NCA-Graphite 200 mAh Pouch cells including phosphate functional ionic liquid electrolytes. As can be seen in FIG. 2, the various phosphate functional ionic liquid electrolytes demonstrate different electrochemical performances, with Electrolytes 3 and 4 showing the most promise.

Figure 3:
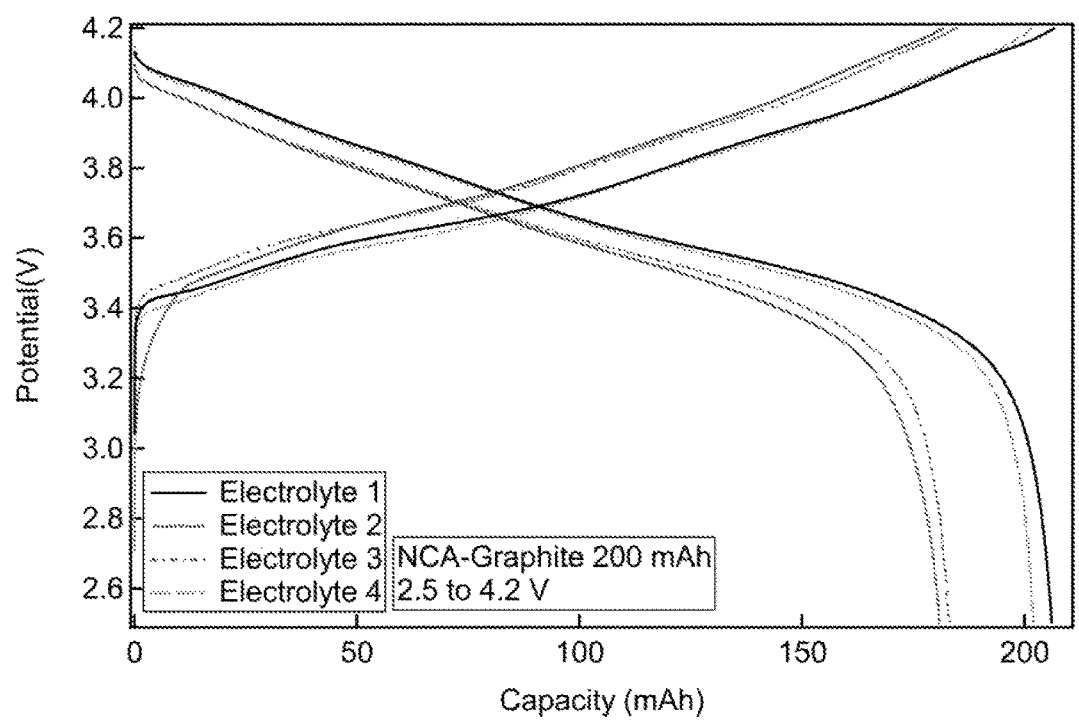
FIG. 3 is a graph of charge and discharge profiles of cells containing ionic liquid electrolytes in accordance with the present disclosure.

FIG. 3 shows charge and discharge profiles of NCA-Graphite 200 mAh Pouch cells including phosphate functional ionic liquid electrolytes. In FIG. 3, the charge and discharge profiles at the 4 cycle at C/5 are shown, demonstrating the cyclability of the phosphate functional ionic liquid electrolytes. The coulombic efficiency at cycle 4 is summarized in Table 4.

TABLE 4

Coulombic efficiency at the fourth cycle in NCA-Graphite 200 mAh Pouch cells including phosphate functional ionic liquid electrolytes.

| Electrolyte | Coulombic Efficiency (%) |
|---|---|
| 1 | 99.7 |
| 2 | 99.5 |
| 3 | 99.0 |
| 4 | 99.9 |

Although various embodiments have been depicted and described in detail herein, it will be apparent to those skilled in the relevant art that various modifications, additions, substitutions and the like can be made without departing from the spirit of the disclosure and these are therefore considered to be within the scope of the disclosure as defined in the claims which follow.

What is claimed:

1. An ionic liquid compound, comprising: an anion comprising an aluminate, arsenide, cyanide, thiocyanate, nitrite, chlorate, chlorite, chromate, sulfate, sulfite, silicate, thiosulfate, oxalate, acetate, formate, hydroxide, nitrate, phosphate, imide, or borate; and a cation attached to a phosphorus moiety according to the formula:

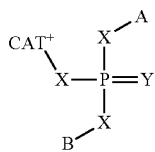

wherein:
A is CAT⁺ or $R_1$
B is CAT⁺ or $R_2$
CAT⁺ is a pyrrolidinium, piperdinium, azepanium, onium, sulfonium, phosphonium, imidazolium, pyridinium or a 5- or 6-membered heterocyclic ring having 1 to 3 heteroatoms as ring members comprising nitrogen, oxygen, silicon or sulfur;
$R_1$ and $R_2$ are independently a methyl or $C_2$-$C_8$ alkyl, alkenyl, alkoxy, aryl, alkynyl, alkylsiloxy, silyl, thioether, sulfoxide, azo, amino or silane group or a phenyl or benzyl, wherein any of the carbon or hydrogen atoms therein are optionally further substituted with a halide, alkyl, alkenyl, alkoxy, aryl, alkynyl, alkylsiloxy, phenyl, benzyl, silyl, thioether, sulfoxide, azo, amino or silane;
Y is O or S, with the proviso that when Y is O, CAT⁺ is not an imidazolium or a pyridinium and $R_1$ and $R_2$ are not methyl or $C_2$-$C_8$ alkyl; and
X is O, S, or N; or O, S, or N attached to a methylene, $C_2$-$C_8$ alkylene, alkenylene, alkynylene, alkoxy, ester, carbonylene, phenylene, thioether, sulfoxide, azo or aryl group, wherein any of the carbon or hydrogen atoms therein are optionally further substituted with a halide.

2. An electrical energy storage device electrolyte comprising:
a) an aprotic organic solvent system;
b) an alkali metal salt;
c) an additive; and
d) an ionic liquid compound, comprising: an anion comprising an aluminate, arsenide, cyanide, thiocyanate, nitrite, chlorate, chlorite, chromate, sulfate, sulfite, thiosulfate, oxalate, acetate, formate, hydroxide, nitrate, phosphate, imide, or borate; and
a cation attached to a phosphorus moiety according to the formula:

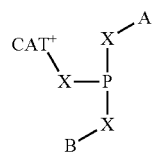

wherein:
A is CAT⁺ or $R_1$
B is CAT⁺ or $R_2$
CAT⁺ is a pyrrolidinium, piperdinium, azepanium, onium, sulfonium, phosphonium, imidazolium, pyridinium or a 5- or 6-membered heterocyclic ring having 1 to 3 heteroatoms as ring members comprising nitrogen, oxygen, silicon or sulfur;
$R_1$ and $R_2$ are independently a methyl or $C_2$-$C_8$ alkyl, alkenyl, alkoxy, aryl, alkynyl, alkylsiloxy, silyl, thioether, sulfoxide, azo, amino or sane group or a phenyl or benzyl, wherein any of the carbon or hydrogen atoms therein are optionally further substituted with a halide, alkyl, alkenyl, alkoxy, aryl, alkynyl, alkylsiloxy, phenyl, benzyl, silyl, thioether, sulfoxide, azo, amino or silane;
Y is O or S, with the proviso that when Y is O, CAT⁺ is not an imidazolium or a pyridinium and $R_1$ and $R_2$ are not methyl or $C_2$-$C_8$ alkyl; and
X is O, S, or N; or O, S, N attached to a methylene, $C_2$-$C_8$ alkylene, alkenylene, alkynylene, alkoxy, ester, carbonylene, phenylene, thioether, sulfoxide, azo or aryl group, wherein any of the carbon or hydrogen atoms therein are optionally further substituted with a halide.

3. The electrolyte of claim 2, wherein the aprotic organic solvent comprises open-chain or cyclic carbonates, carboxylic acid esters, nitrites, ethers, sulfones, ketones, lactones, dioxolanes, glymes, crown ethers, siloxanes, phosphoric acid esters, phosphates, phosphites, mono- or polyphosphazenes or mixtures thereof.

4. The electrolyte of claim 2, wherein the cation of the alkali metal salt comprises lithium, sodium, aluminum or magnesium.

5. The electrolyte of claim 2, wherein the additive comprises sulfur-containing compounds, phosphorus-containing compounds, boron-containing compounds, silicon-containing compounds, fluorine-containing compounds, nitrogen-containing compounds, compounds containing at least one unsaturated carbon-carbon bond, carboxylic acid anhydrides or the mixtures thereof.

6. The compound of claim 1, wherein either or both of A and B is CAT+.

7. The compound of claim 1, wherein either or both of $R_1$ and $R_2$ is phenyl, wherein any of the carbon or hydrogen atoms therein are optionally further substituted with a halide, alkyl, alkenyl, alkoxy, aryl, alkynyl, alkylsiloxy, phenyl, benzyl, silyl, thioether, sulfoxide, azo, amino or silane.

8. The compound of claim 1, wherein Y is S.

* * * * *

UNITED STATES PATENT AND TRADEMARK OFFICE
CERTIFICATE OF CORRECTION

Page 1 of 1

PATENT NO. : 10,868,332 B2
APPLICATION NO. : 15/476342
DATED : December 15, 2020
INVENTOR(S) : Surya Moganty et al.

It is certified that error appears in the above-identified patent and that said Letters Patent is hereby corrected as shown below:

In the Claims

Column 15, in Claim 2, Line 45, Please delete the existing formula in Claim 2 and replace it with a copy of the formula appearing in Claim 1 (Column 15, Line 1).

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*